US005341479A

United States Patent [19]

Dean et al.

[11] Patent Number: 5,341,479

[45] Date of Patent: Aug. 23, 1994

[54] ADDRESS MARK TRIGGERED READ/WRITE HEAD BUFFER

[75] Inventors: Robert E. Dean, Boulder; Steven C. Cacka, Longmont; Douglas P. Schaefer, Lafayette; Hossein F. Sevvom, Boulder; Robert A. Brumnet, Denver, all of Colo.

[73] Assignee: Storage Technology Corporation, Louisville, Colo.

[21] Appl. No.: 778,301

[22] Filed: Oct. 16, 1991

Related U.S. Application Data

[63] Continuation of Ser. No. 304,664, Jan. 31, 1989, abandoned.

[51] Int. Cl.[5] .............. G06F 13/00

[52] U.S. Cl. .............. 395/250; 395/425; 360/72.2; 364/DIG. 1; 364/239; 364/239.4; 364/239.7; 364/243; 364/243.4; 364/253; 364/253.1

[58] Field of Search .............. 395/250, 425; 360/48, 360/49, 72.2

[56] References Cited

U.S. PATENT DOCUMENTS

| | | | |
|---|---|---|---|
| 4,053,944 | 10/1977 | Dixon | 395/375 |
| 4,241,420 | 12/1980 | Fish et al. | 395/425 |
| 4,271,519 | 6/1981 | Hall | 371/38 |
| 4,468,730 | 8/1984 | Dodd et al. | 395/425 |
| 4,583,166 | 4/1986 | Hartuny et al. | 395/425 |
| 4,603,380 | 7/1986 | Easton et al. | 395/425 |
| 4,723,223 | 2/1988 | Hanada | 395/425 |
| 4,868,734 | 9/1989 | Idleman et al. | 395/275 |
| 4,914,656 | 4/1990 | Dunphy, Jr. et al. | 371/10.2 |
| 4,918,651 | 4/1990 | Bouke et al. | 395/800 |
| 4,984,103 | 1/1991 | Nigam | 360/74.1 |
| 5,014,237 | 5/1991 | Masters et al. | 395/500 |
| 5,155,811 | 10/1992 | Dean et al. | 395/250 |
| 5,218,689 | 6/1993 | Hotle | 395/425 |

*Primary Examiner*—Paul V. Kulik

*Attorney, Agent, or Firm*—Duft, Graziano & Forest

[57] ABSTRACT

The address mark triggered read/write head buffer provides a buffer memory for each read/write head in the rotating media data storage system that stores the entire track of data that includes the requested data record. Thus, the address mark triggered read/write head buffer retrieves the requested data record independent of the control module so that a seek request from the processor can be handled as soon as the beginning of the next data record stored on the track is positioned below the associated read/write head. The entire track is thereby staged faster on the average than the time to retrieve the requested data record. The address mark triggered read/write head buffer includes an address mark detection circuit to identify the beginning of the data field in each data record. The address mark is a predetermined data pattern of n bits that is written on the track a predetermined distance in advance of the data field of the data record. The address mark detection circuit compares the n data bits most recently read from the track with this predetermined data pattern of n bits as stored in memory. Once a match is detected, the buffer is enabled to store the next data record written on the track and all subsequent data records on the track.

17 Claims, 3 Drawing Sheets

ADDRESS MARK TRIGGERED READ/WRITE HEAD BUFFER

This is a continuation of application Ser. No. 07/304,664, filed Jan. 31, 1989 now abandoned.

CROSS REFERENCE TO RELATED APPLICATIONS

This application is related to application Ser. No. 304,662 entitled Read/Write Head Buffer now U.S. Pat. No. 5,155,811 and application Ser. No. 304,788 entitled Track Image Read/Write Head Buffer, now abandoned in favor of continuation application Ser. No. 07/622,922, filed Jan. 18, 1991, both filed on the same date as this application.

FIELD OF THE INVENTION

This invention relates to data storage systems and, in particular, to a data buffer that is used in a rotating media data storage system to improve the data transfer performance of the data storage system.

PROBLEM

It is a problem in the field of data storage systems to minimize the data retrieval time when reading a data record from a data storage system. In disk drive memory systems for example, a processor is typically connected by a channel interface unit to a plurality of data channels. Each data channel is connected to one or more Direct Access Storage Device (DASD) units which function to store large quantities of data. Each DASD unit includes a control unit for interfacing with the data channel that typically carries eight bit parallel data in a byte serial decoded input/output record format. The control unit performs a data management function to maintain records of the location of all the data stored in the DASD unit. The DASD unit includes rotating data storage media consisting of a plurality of disks, each of which has associated therewith one or more moveable read/write heads. The data is stored on the rotating media in a track format that consists of a plurality of concentric rings of data. A control module is also included at the head of a string of disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which series to read and write data on an associated disk of the rotating media.

In a data record read operation, the processor transmits a seek request, through the channel interface unit and an available data channel, to the DASD control unit associated with the rotating media on which the requested data record is stored. The processor, upon completion of the transmission of the seek request, returns to processing other tasks. The DASD control unit responds to the seek request by determining the physical location of the requested data record on the plurality of disks. The control unit transmits information to the associated control module identifying the physical location and size of the data record in order to retrieve the requested data record from one of the disks of the rotating media. Since the data record is stored in a track format on a rotating media, the actuator associated with the identified disk of the rotating media on which the requested data record is stored must wait until the rotating media rotates a sufficient distance to present the beginning of the requested data record underneath the read/write head associated with the actuator.

A predetermined time before the beginning of the requested data record reaches the read/write head associated with the actuator, the control module requests the control unit to obtain a data communication path to the processor in order to transmit the retrieved data record from the rotating media directly to the processor over this data communication path. If a data communication path to the processor is not available, the control module must wait for one entire revolution of the rotating media before the media is again in the position where the requested data record is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system, where there are a multitude of random data seeks, such delays can unnecessarily tie up actuators in the disk drive unit and significantly increase the system response time.

SOLUTION

The above described problems are solved and a technical advance, achieved in the field by the address mark triggered read/write head buffer that improves data transfer performance in a rotating media data storage system by rendering the data read operation at the read/write head independent of the control module, control unit and the availability of the data communication path from the control unit to the processor. This is accomplished by providing a buffer memory for each read/write head in the rotating media data storage system that stores the entire track of data that includes the requested data record. Thus, the address mark triggered read/write head buffer retrieves the requested data record independent of the control module so that a seek request from the processor can be handled as soon as the beginning of the next data record stored on the track is positioned below the read/write head of the associated actuator. The entire track is thereby staged faster on the average than the time to retrieve the requested data record.

The address mark triggered read/write head buffer includes an address mark detection circuit to identify the beginning of the data field in each data record. The address mark is a predetermined data pattern of n bits that is written on the track a predetermined distance in advance of the data field of the data record. The address mark is followed by a sync field that enables the read/-write circuit in the data storage system to attain frequency lock with the data written on the track of the rotating media. The address mark detection circuit compares the n data bits most recently read from the track with this predetermined data pattern of n bits as stored in memory. Once a match is detected, the read/-write circuit attains frequency lock with the sync field and the buffer is enabled to store the data written in the data field of the next data record written on the track, Upon the positioning of this data field under the read/- write head at the conclusion of this predetermined distance. The entire track is written into the read/write head buffer and the servo driver pointer keeps track of the location of the sector that contains the requested data record. Thus, the address mark detection circuit enables the read/write head buffer to read the track containing the requested data record independent of the control module.

The entire track on the rotating media that includes the requested data record can be read from the rotating media by the read/write head and stored in the address mark triggered read/write head buffer independent of the availability of a data communication path to the processor. Thus, the read data record operation need not be synchronized with the availability of a data communication path to the processor. In addition, there is a high probability that successive data record read operations will request data records from the same data storage track on the rotating media as contained the requested data record. This is because program instructions are generally sequentially executed and are also stored in memory in this sequential order. Thus, by storing more than just the requested data record in the buffer, the data record read response time can be improved by using the buffer as a track staging memory.

The data records in the track read by the read/write head are stored in the address mark triggered read/write head buffer in two, seven run length limited (RLL) self clocking code format with the error correction code bits appended to each data record. The address mark triggered read/write head buffer does not process the track image read from the rotating media but instead stores this track image for subsequent deformatting and processing by the control module. The read/write head buffer includes a phase locked loop to maintain signal clocking independent of the control module. By providing the read/write head buffer on a one per actuator basis, the response time of the rotating media data storage system for a memory access is significantly reduced since the entire track that contains the requested data record is retrieved from the rotating media as soon as the next data record on the track is properly positioned and in no case will this time be greater than one revolution of the rotating media. In addition, the storage of a plurality of data records in the address mark triggered read/write head buffer speeds up the data record retrieval time for subsequently requested data records, as mentioned above.

The error correction codes written on the rotating media to protect the integrity of the requested data record are maintained since they are stored in the read/write head buffer along with the data record. Thus, once a data communication path is established to the processor, the control module receives the image that was stored on the rotating media from the read/write head buffer and can deformat this data from the bit serial, two, seven run length limited self clocking coding with error correction characters format of this data and convert this information to eight bit parallel data that is in an input/output record format for use by the control unit. The control unit stores the decoded error checked data record and transmits the requested data record to the processor over the available data channel if a full track buffer is present in the cache. If the cache is not equipped with a full track buffer, only the count and key records are buffered. In this fashion, the read/write head buffer enables the processor to effectively "start" and "stop" the rotating media to obtain data stored thereon. While the rotation of the rotating media is not interrupted, the use of the address mark triggered read/write head buffer enables the processor both to have access to a data record independent of the operation of the rotating media and to have the remainder of the data storage track staged in the address mark triggered read/write head buffer.

BRIEF DESCRIPTION OF THE DRAWING

FIG. 4 illustrates the address mark detection circuit in block diagram form.

DETAILED DESCRIPTION

Figure 1:
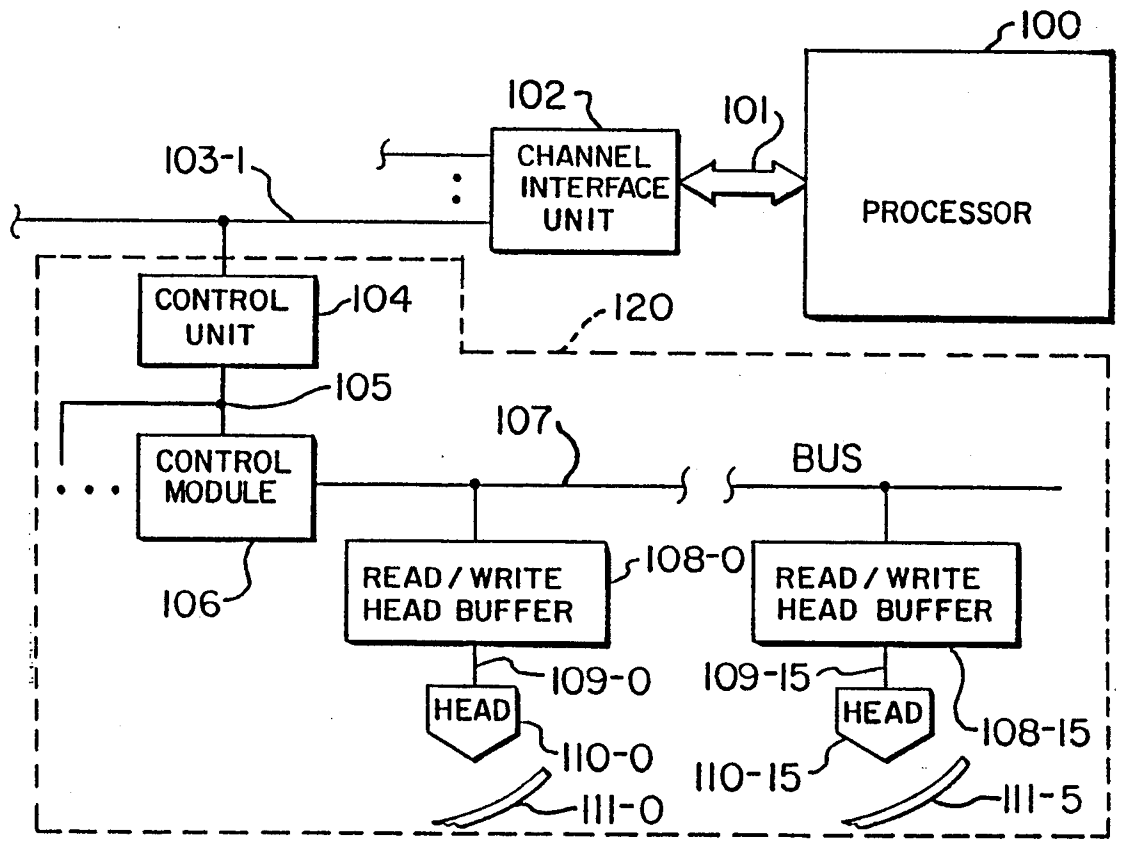
FIG. 1 illustrates the overall architecture of the read/write head buffer as placed in a data processing environment.

In computer systems, a processor is typically connected by a channel interface unit to a plurality of data channels. Each data channel is connected to one or more Direct Access Storage Device (DASD) units which function to store large quantities of data. These DASD units typically use rotating data storage media comprised of either optical disks or magnetic disks to store data records thereon.

A typical DASD unit is the IBM 3380-type disk drive unit that uses magnetically readable/writable disks as the data storage media. Each of these 3380-type DASD units includes a control unit for interfacing with a data channel to the processor that typically carries eight bit parallel data in a byte serial decoded input/output record format. The control unit performs a data management function to maintain records of the physical location of all the data stored on the DASD unit. The DASD unit includes rotating data storage media typically consisting of a plurality of magnetically readable/writable disks, each of which has associated therewith one or more moveable read/write heads. The data is stored on the rotating media in a track format that consists of a plurality of concentric rings of data. A control module is also included at the head of a string disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

Data Record Read Operation

In a data record read operation, the processor transmits a seek request, through the channel interface unit and an available data channel, to the DASD control unit associated with the rotating media on which the requested data record is stored. The processor, upon completion of the transmission of the seek request, returns to processing other tasks. The DASD control unit responds to the seek request by determining the physical location of the requested data record on the plurality of disks. The control unit transmits information to the associated control module identifying the physical location and size of the data record in order to retrieve the requested data record from one of the disks of the rotating media. Since the data record is stored in a track format on a rotating media, the actuator associated with the identified disk of the rotating media on which the requested data record is stored must wait until the rotating media rotates a sufficient distance to present the beginning of the requested data record underneath the read/write head associated with the actuator.

A predetermined time before the beginning of the requested data record reaches the read/write head associated with the actuator, the control module requests the control unit to obtain a data communication path to the processor in order to transmit the retrieved data record from the rotating media directly to the processor over this data communication path. If a data communication path to the processor is not available, the control module must wait for one entire revolution of the rotating media before the media is again in the position where the requested data record is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system where there are a multitude of random data seeks, such delays can unnecessarily tie up actuators in the disk drive unit and significantly increase the system response time.

The address mark triggered read/write head buffer improves data transfer performance in a rotating media data storage system by rendering the data read operation at the read/write head independent of the control module, control unit and the availability of the data communication path from the control unit to the processor. This is accomplished by providing a buffer memory for each read/write head in the rotating media data storage system that stores the entire track of data that includes the requested data record. Thus, the address mark triggered read/write head buffer retrieves the requested data record independent of the control module so that a seek request from the processor can be handled as soon as the beginning of the next data record stored on the track is positioned below the read/write head of the associated actuator. The entire track is thereby staged faster on the average than the time to retrieve the requested data record.

The address mark triggered read/write head buffer includes an address mark detection circuit to identify the beginning of the data field in each data record. The address mark is a predetermined data pattern of n bits that is written on the track a predetermined distance in advance of the data field of the data record. The address mark is followed by a sync field that enables the read/write circuit in the data storage system to attain frequency lock with the data written on the track of the rotating media. The address mark detection circuit compares the n data bits most recently read from the track with this predetermined data pattern of n bits as stored in memory. Once a match is detected, the read/write circuit attains frequency lock with the sync field and the buffer is enabled to store the data written in the data field of the next data record written on the track, upon the positioning of this data field under the read/write head at the conclusion of this predetermined distance. The entire track is written into the read/write head buffer and the servo driver pointer keeps track of the location of the sector that contains the requested data record. Thus, the address mark detection circuit enables the read/write head buffer to read the track containing the requested data record independent of the control module.

The entire track on the rotating media that includes the requested data record can be read from the rotating media by the read/write head and stored in the address mark triggered read/write head buffer independent of the availability of a data communication path to the processor. Thus, the read data record operation need not be synchronized with the availability of a data communication path to the processor. In addition, there is a high probability that successive data record read operations will request data records from the same data storage track on the rotating media as contained the requested data record. This is because program instructions are generally sequentially executed and are also stored in memory in this sequential order. Thus, by storing more than just the requested data record image in the buffer, the data record read response time can be improved by using the buffer as a track staging memory.

The data records in the track read by the read/write head are stored in the address mark triggered read/write head buffer in run length limited self clocking code format (such as 2, 7 coding) with the error correction code bits appended to each data record. The address mark triggered read/write head buffer does not process the track image read from the rotating media but instead temporarily stores this track image for subsequent deformatting and processing by the control module. The read/write head buffer includes a phase locked loop to maintain signal clocking independent of the control module. By providing the read/write head buffer on a one per actuator basis, the response time of the rotating media data storage system for a memory access is significantly reduced since the entire track that contains the requested data record is retrieved from the rotating media as soon as the next data record on the track is properly positioned and in no case will this time be greater than one revolution of the rotating media. In addition, caching a plurality of data records, including the requested data record, speeds up the data retrieval time for subsequently requested data records, as mentioned above.

The error correction codes written on the rotating media to protect the integrity of the requested data record are maintained since they are stored in the read/write head buffer along with the data record. Thus, once a data communication path is established to the processor, the control module receives the image that was stored on the rotating media from the read/write head buffer and can deformnat this data from the bit serial, run length limited self clocking (ex. two, seven) coding with error correction characters format of this data and convert this information to eight bit parallel data that is in an input/output record format for use by the control unit. The control unit stores the decoded error checked data record and transmits the requested data record to the processor over the available data channel. In this fashion, the read/write head buffer enables the processor to effectively "start" and "stop" the rotating media to obtain data stored thereon. While the rotation of the rotating media is not interrupted, the use of the address mark triggered read/write head buffer enables the processor both to have access to a data record independent of the operation of the rotating media and to have the remainder of the data storage track staged in the address mark triggered read/write head buffer.

System Architecture

FIG. 1 illustrates the overall architecture of a data processing system that is equipped with an associated data storage system that includes a plurality of memory devices, one of which is illustrated in FIG. 1 in the form of a conventional 3380-type of disk drive unit 120. Processor 100 is connected via bus 101 to a channel interface unit 102 that serves to interconnect processor 100 with a plurality of data channels 103-1 to 103-n, each of which is an eight bit parallel data bus. Connected to one of these data channels 103-1 is the disk drive unit 120 mentioned above.

Disk drive unit 120 includes a control unit 104 that functions to provide overall management of the disk drive unit 120. This management function includes storing information that identifies the exact physical location of all data stored on the rotating media 111-0 to 111-15 of disk drive unit 120. Processor 100 identifies a data record by volume identification and address. While this information provides a general physical location of the data, the exact storage location on the rotating media 111-0 to 111-15 requires additional specificity. Control unit 104 provides this additional specific information by converting the volume and address information received from the processor into head, actuator, track and sector identification information to precisely define the physical location of the requested data record on disk drive unit 120.

The control unit 104 transfers data between data channel 103-1 and one or more control modules (ex. 106) in an eight bit parallel data format wherein each eight bits of data comprise one of a series of bits of the data record in a decoded input/output record format. The data in this format is converted by control module 106 into a bit serial format wherein error correction code characters are appended thereto for error detection and control purposes. The resultant data is then encoded into two, seven code. The control module 106 responds to the control signals transmitted by control unit 104 identifying the head, actuator, track and sector for storing a data record by selecting one of the actuators 110-0 to 110-15 that are used by disk drive unit 120 to read/write data on the rotating media 111-0 to 111-15. While sixteen actuators are illustrated herein, it is expected that future devices may be equipped with 32 or more actuators. The actuators include the read/write head and signal control circuitry for reading and writing the data on the rotating media 111-0 to 111-15.

The above-described conventional disk drive unit 120 of FIG. 1 is also equipped with a plurality of address mark triggered read/write head buffers 108-0 to 108-15 on a one per read/write head basis. The address mark triggered read/write head buffer 108-0, for example, is interposed between bus 107 and read/write head 110-0. The exact physical implementation of this address mark triggered read/write head buffer can also be a single memory connected to bus 107 and partitioned into segments, one segment for each read/write head 108 in disk drive unit 120. Address mark triggered read/write head buffer 108-0 serves to temporarily store the entire data storage track image captured by the read/write head 110-0.

Address Mark Triggered Read/Write Head Buffer Circuit

Figure 2:
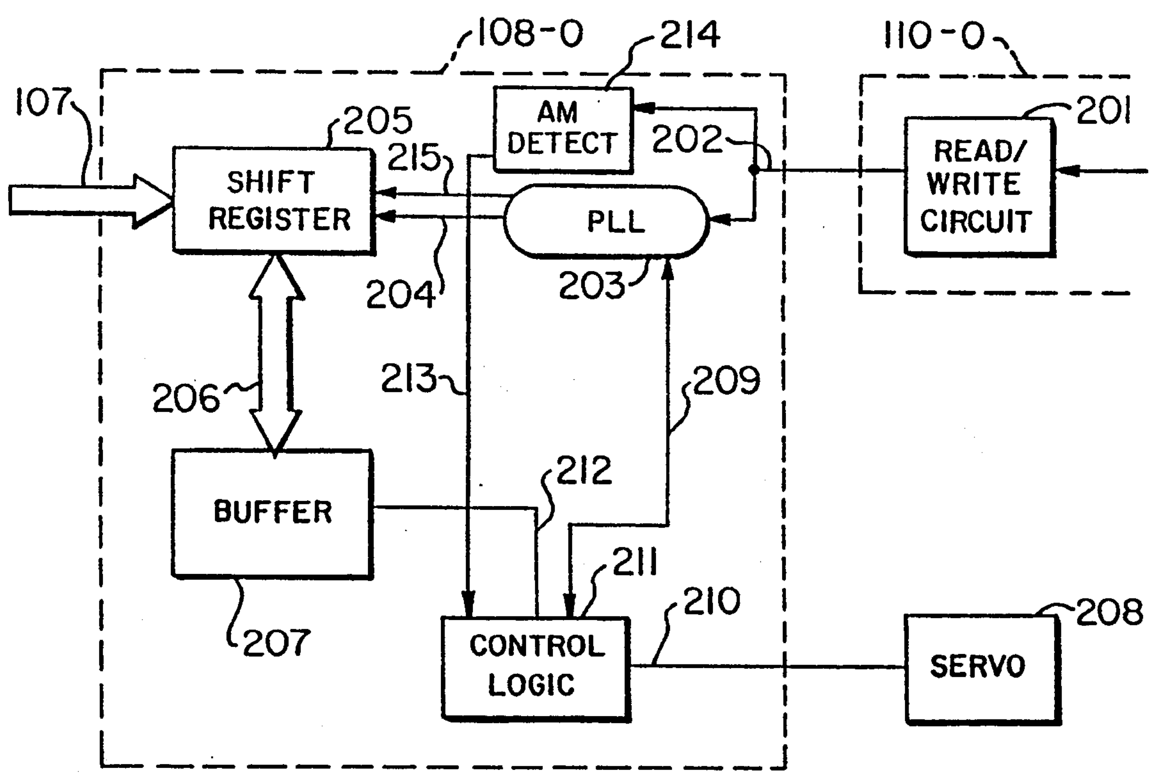
FIG. 2 illustrates additional circuit details of the read/write head buffer.

FIG. 2 illustrates additional detail of address mark triggered read/write head buffer 108-0. Data is read in analog form by read/write circuit 201 of read/write head 110-0 and converted into a digital signal that is typically self clocked. The digital data signal is transmitted by read/write circuit 201 on lead 202 to address mark triggered read/write head buffer 108-0 where it is applied to phase locked loop 203 and address mark detect circuit 214. The address mark detect circuit 214 monitors the digital data signal to identify the presence of an address mark (AM) that precedes the count field in each data record stored on the media 111-0. Once address mark detect circuit 214 verifies the presence of the address mark (AM), the phase locked loop 203 is activated to separate the data from the clock in the digital data signal and applies the data via lead 215 and the clock via lead 204 to shift register 205. The synchronization field that follows the address mark also enables phase locked loop 203 to attain frequency lock with the data in the data record. The clock and data signals on leads 204 and 215 enable shift register 205 to receive the serial bits of data and store these data bits in its memory. Each 16 bit byte of 2, 7 encoded data that is stored in shift register 205 is transmitted over bus 206 in parallel form to buffer 207. The addressing of buffer 207 is accomplished by the use of the disk drive servo 208 which identifies the sector count of the rotating media in well-known fashion and outputs this information on lead 210 to control logic 211. The sector count is converted by control logic 211 to a pointer value that is output on lead 212 to address buffer 207. The clock signal from phase locked loop 203 is used to maintain clock timing synchronization to load data into buffer 207. Thus, the digital data signal that is read from the rotating media 111-0 is maintained in the proper clocking synchronization by the use of phase locked loop 203 so that the data stored via shift register 205 in buffer 207 accurately represents the data stored on the track of the rotating media 111-0.

The accuracy of this data stored in buffer 207 is insured because this data along with its associated error correction code bits is stored in a two, seven code format. The image of the entire data storage track is thereby temporarily stored in buffer 207 for transmission to control module 106 via shift register 205 and bus 107. Address mark triggered read/write head buffer 108-0 therefore appears transparent to control module 106 in that the output of address mark triggered read/write head buffer 108-0 is identical to the signal output by read/write head 110-0 except for its lack of synchronization with the rotating media 111-0. Control module 106 resynchronizes the data obtained from address mark triggered read/write head buffer 108-0, therefore any data storage errors occasioned by address mark triggered read/write head buffer 108-0 due to defects in the rotating media 111-0 or address marks are easily corrected by control module 106 by use of its own internal phase locked loop and error correction circuitry. Maintenance of the error correction codes through address mark triggered read/write head buffer 108-0 minimizes the possibility of an error occurring in the data transfer process.

Track Data Image

Figure 3:
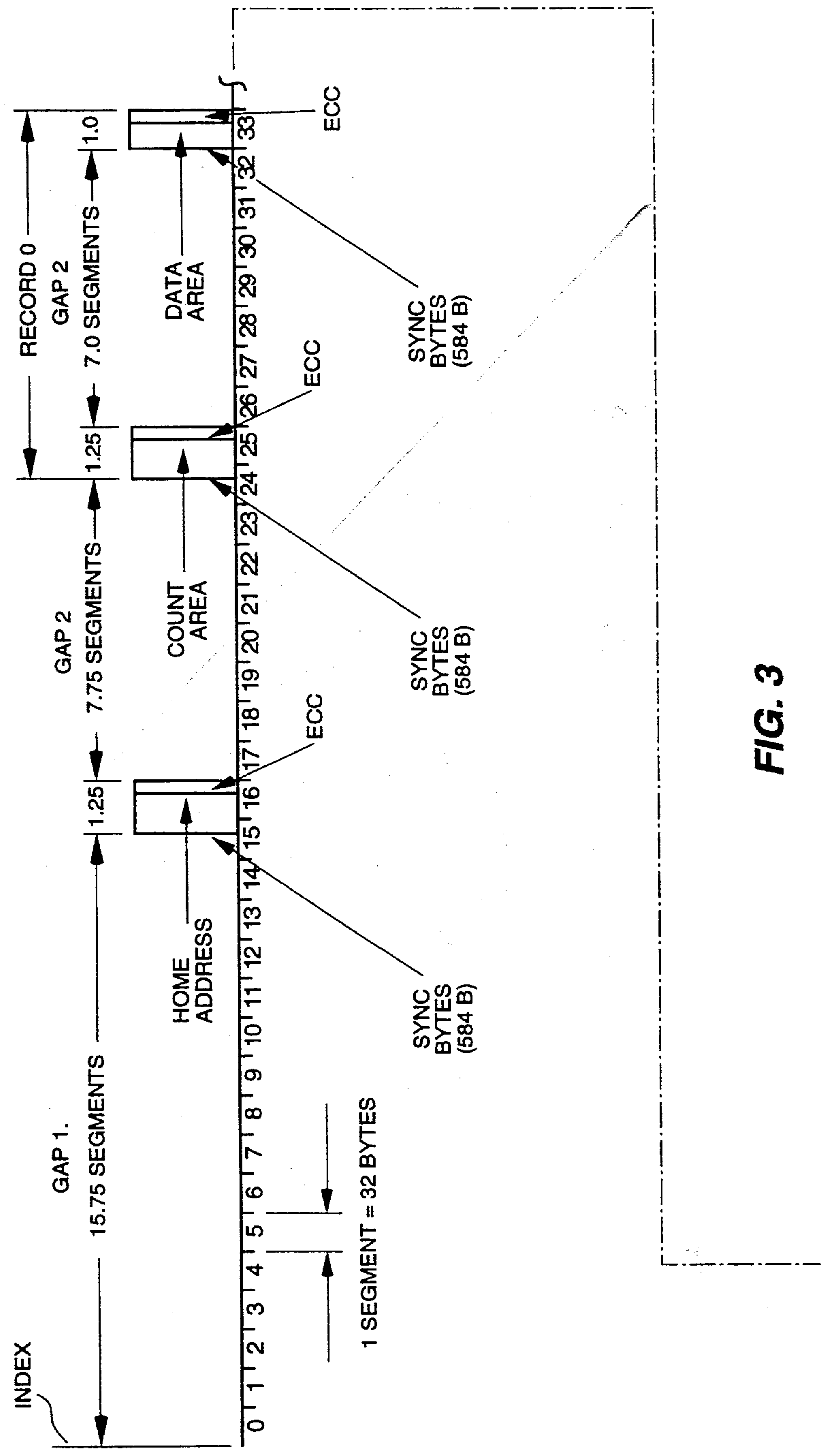
FIG. 3 illustrates the format of the data storage track.
Figure 3A:
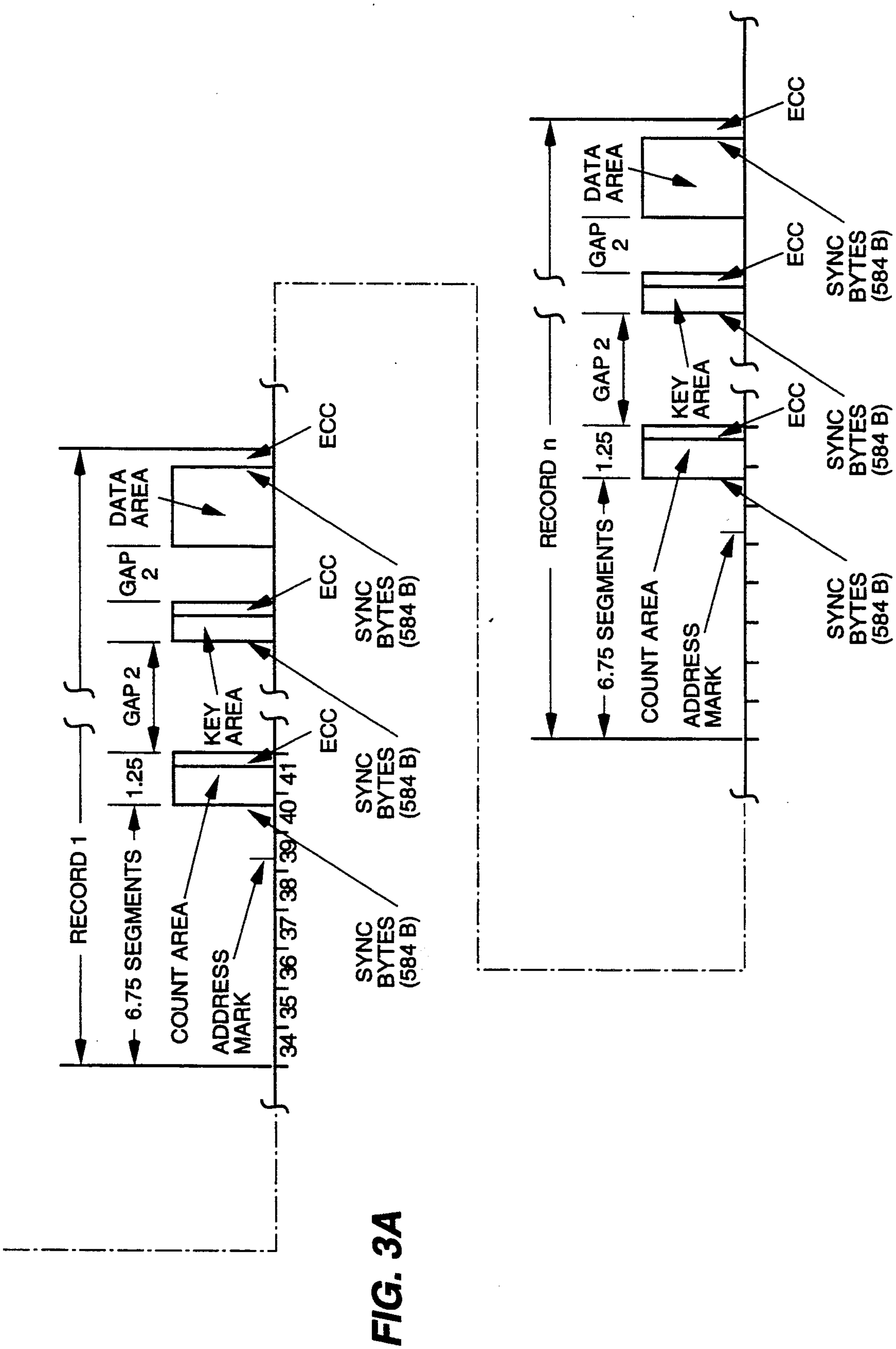

The format of a typical data storage track is illustrated in FIG. 3. This format is the standard count key data format well known in the field of data storage systems. The data storage track consists of a plurality of data records (Record 0, Record 1, . . . Record N) that are concatenated together to form a continuous string of data. Each data record (Record 1) contains a variable amount of the actual data, to which has been prepended a count field and an optional key field that are control information indicative of the size of the data field. The count, key and data fields are separated from each other by gap fields of predetermined length. Each gap field contains a predetermined sequence of 1s and 0s indicative of a particular gap field. This enables the control module 106 to simply determine the location of the count, key and data fields. Also included in the gap field that separates the count and key fields is an address mark (AM) that typically is used by the control module 106 to locate the beginning of the data field. The address mark (AM) is located a predetermined distance (number of bits) in advance of the key and data fields in the data record (Record 1).

Control module 106, in response to a data record retrieval request from processor 100, as translated into a head/actuator/track/sector identifier by control unit 104, monitors the data read by the designated read/write head from the selected data storage track. Control module 106 senses the gaps, address mark and count/key fields in each data record. Upon the positioning of the next data record in the track that contains the requested data record under the read/write head, control module 106 enables the associated address mark triggered read/write head buffer (ex 108-0) to store the track image of the track that contains the requested data record. Control module 106 signals control unit 104 once the track containing the requested data record is stored in the associated address mark triggered read/write head buffer, 108-0. Once a data communication path is available from control unit 104 to processor 100 via one of data channels 103-1 to 103-n, control unit 104 retrieves the requested data record from control module 106 for transfer to processor 100. This is accomplished by control logic 211 addressing buffer 207 to output the requested data record via bus 107. Address mark triggered read/write head buffer 108-0 concurrently transfers the requested data record to control module 106 while storing the remainder of the data storage track if an entire track is staged. As a matter of design choice, the track image is stored beginning with the first data record that appears on the data storage track following the receipt of the data record retrieval request. The requested data record, when read from the data storage track, is then retrieved from address mark triggered read/write head buffer 108-0 by control module 106 for transmission to processor 100.

Direct Transfer Mode

In a certain percentage of read data record operations, the requested data record need not be buffered since a data communication path from the control unit 104 to processor 100 is available when the data record is read from the rotating media 111-0 to 111-15. In this case, the retrieval data record is read on a bitwise bias from the rotating media 111-0 to 111-15 by read/write circuit 201 and stored on a bytewise basis in shift register 205. The retrieved data record is then transmitted in parallel via bus 107 to control module 106. Once the requested data record is transmitted to control unit 104, the remainder of the data storage track is read from the rotating media 111-0 to 11-15 and stored in buffer 207 via shift register 205 for possible later use by processor 100. Buffer 207 is therefore switchably connected to bus 107 since it is used either to store the entire data storage track when the data communication path from the control unit 104 to processor 100 is unavailable at the time of reading the requested data record from the rotating media 111-0 to 111-15 or to store the remainder of the data storage track if the data communication path is available.

Address Mark Detection Circuit

The address mark detection circuit 214 illustrated in FIG. 4 is used to efficiently locate the start of the next record located on the track that contains the requested data record. This circuit is part of each read/write head buffer (108-0 to 108--15) that is associated with each read/write head (110-0 to 110-15) of disk drive unit 120. Each data record (ex Record 1) that is written on a track of the rotating media 111-0 to 111--15 includes an Address Mark field that is prepended to the data contained in the record. The Address Mark is a predetermined data pattern of n bits that appears a predetermined number of bits (and therefore a predetermined time) in advance of the start of the data field of the record. Therefore, detecting the presence of the Address Mark provides a precise indication of the location of the data contained in the record.

The Address Mark Detection Circuit of FIG. 4 accomplishes this function by comparing the data bits read from the track of the rotating media 111-0 by read/write head 110-0 with the predetermined data pattern of n bits as stored in a pattern detection circuit 403. In operation, processor 100 transmits a read data record request to disk drive 120 via an available data channel (103-1). As described above, control unit 104 identifies the precise physical location of the requested data record on the rotating media 111-0 to 111-15. Control module 106 selects the one (ex 110-0) of read/write heads (110--0 to 110-15) that is associated with the identified physical location of the requested data record. The output of disk drive servo 208 identifies the sector count of the rotating media 111-0 and control logic 211 produces a Search Address Mark signal on lead 413 when the sector containing the requested data record is positioned under read/write head 110-0. The Search Address Mark signal enables counter 401 to store the most recently read n bits of data from read/write head 110-0 as present on lead 202 as described above. The clock signal generated by phase locked loop 203 on lead 204 enables counter 401 to shift each received data bit into its memory while discarding the n+1 th last received data bit.

Pattern Decode circuit 402 produces an address mark search signal of predetermined duration in response to the search address mark signal from control logic 211. This fixed duration signal thereby creates a "window" during which time the header portion of record 1 is scanned for the address mark. Pattern Detection circuit 402 compares the last n bits received by counter 401 and output on leads 414 with the predetermined data pattern of n bits that represents the standard address mark signal. When pattern detection circuit 403 identifies the identical pattern of n data bits stored in counter 401 that represents the address mark, it outputs an address mark found signal on lead 416 to control logic 211. The data field of record 1 appears a predetermined number of bits following the address mark and control logic 211 can therefore enable shift register 205 to begin transferring the data bits read from the rotating media 111-0 by read/write head 110-0 to buffer 207 once the data field is reached.

The use of an address mark detector circuit 214, located at the read/write head 201, enables the staging of the entire track that contains the requested data record without requiring the intervention of the control module 105. This speeds up the data retrieval process and reduces the demands on control module 105. Thus, buffer 207 functions as a track staging memory located at the read/write head 110-0.

While a specific embodiment of the present invention has been disclosed, it is expected that those skilled in the art can and will devise alternate embodiments that fall within the scope of the appended claims.

I claim:

1. In a data processing system that includes a processor connected by at least one data channel to at least one control module, each control module being connected by a bus to a plurality of read/write heads and including a plurality of buffers, each one of which is connected to said bus and an associated one of said plurality of read/write heads, a method of buffering data receiving from each of said plurality of read/write heads into said associated buffer comprising the steps of:

detecting, in response to said processor requesting a data record, an address mark written on a designated data storage track of said rotating media;

writing said designated track into said buffer.

2. The method of claim 1 further including the steps of:

transmitting, in response to the availability of a data channel from said control module to said processor, said requested data record from said buffer to said control module via said bus.

3. In a data processing system that includes a processor connected by at least one data channel to at least one control module, each control module being connected by a bus to a plurality of read/write heads for reading/writing data on a rotating data storage media and a like plurality of buffers, each connected to one of said plurality of read/write heads, a method of buffering data in each of said buffers comprising the steps of:

writing, in response to said processor requesting a data record stored on said rotating data storage media, a track of said rotating data storage media that contains said requested data record into said buffer;

retrieving, in response to an availability of a data channel from said control module to said processor, said requested data record from said one track stored in said buffer;

transmitting, in response to an availability of a data channel from said control module to said processor, said requested data record from said buffer to said control module via said bus.

4. A data storage system connected to a processor by at least one data channel, said data storage system comprising:

a control module;

a plurality of rotating data storage media;

a plurality of read/write heads, each of which reads and writes data on tracks on an associated one of said rotating data storage media, where each data record stored on each of said tracks includes a header portion prepended thereto containing control information and a predefined data pattern of n bits;

a common bus connected to said control module and said plurality of read/write heads for exchanging control and data signals therebetween;

a plurality of data buffer apparatus, each of said data buffer apparatus being connected to said common bus and one of said read/write heads, each of said data buffer apparatus comprising:

means for storing at least n bits of said data most recently read from a track of said associated rotating data storage media by said one read/write head;

means for comparing said n stored bits of data, as each bit is read from said track, with a predefined data pattern of n bits; and buffer means, connected to said bus and said one read/write head and responsive to said stored data matching said predefined data pattern for storing said track containing said requested data record.

5. The apparatus of claim 4 wherein said data pattern of n bits appears on said track a predefined distance in advance of data contained in a data record to which said data pattern is prepended, said buffer means including:

buffer memory means for storing data therein;

means responsive to said comparing means detecting a match for activating said buffer memory means to store said data record upon said rotating data storage media having rotated said predetermined distance.

6. The apparatus of claim 5 further comprising:

means responsive to a data channel being available from said control module to said processor for transmitting said requested data record from said buffer means to said control module via said bus.

7. A data storage system connected to a processor by at least one data channel, said data storage system comprising:

a control module;

a plurality of read/write heads, each of which reads and writes data on tracks on a rotating data storage media, where each data record stored on each of said tracks includes a header portion prepended thereto containing control information and a predefined data pattern of n bits;

a common bus connected to said control module and said plurality of read/write heads for exchanging control and data signals therebetween;

apparatus in each of said read/write heads for retrieving from a designated track a data record requested by said processor comprising:

means for storing at least n bits of said data most recently read from a track of said rotating data storage media by said read/write head;

means responsive to said processor requesting said data record for generating an address mark search signal of predetermined duration;

means responsive to said address mark search signal for comparing said n stored bits of data, as each bit is read from said designated track, with said predefined data pattern of n bits;

means, connected to said bus and said read/write heads and responsive to said n bits of stored data matching said predefined data pattern of n bits, for staging said track beginning with a data record presently read by said read/write head into said storing means.

8. The apparatus of claim 7 wherein said data pattern of n bits appears on said designated track a predefined distance in advance of data contained in a data record to which said data pattern is prepended, said storing means including:

buffer memory means for storing data therein;

means responsive to said comparing means detecting a match for activating said buffer memory means to store said data record upon said rotating data storage media having rotated said predetermined distance.

9. The apparatus of claim 8 wherein said data buffer apparatus further comprises:

means responsive to a data communication path being available from said control module to said processor for transmitting said requested data record from said storing means to said control module via said bus.

10. The apparatus of claim 7 wherein said comparing means includes:

means responsive to said n stored bits of data matching said predefined data pattern of n bits during the duration said address mark search signal is extant for producing an address mark found signal.

11. The apparatus of claim 10 wherein said predefined pattern of n bits is read by said read/write head from said designated track a predetermined time prior to a data field in a data record presently read by said read/write head being read by said read/write head, said storing means includes:

buffer memory means for storing data therein;

means responsive to said address mark found signal for enabling said buffer memory means to store said data record upon a conclusion of said predetermined time.

12. A data storage system connected to a processor by at least one data channel, said data storage system comprising:

a control module;

a plurality of address mark triggered read/write head buffers, each of which reads and writes data to a rotating media;

a common bus connected to said control module and said plurality of address mark triggered read/write head buffers for exchanging control and data signals therebetween;

each one of said plurality of address mark triggered read/write buffers comprising:

read/write head means for transferring data from/to said rotating media;

buffer means connected to said bus and said read/write head means for storing data read by said read/write head means from said rotating media;

means responsive to said processor requesting a data record stored on a designated track of said rotating media for sensing a presence of an address mark written on said designated track at a beginning of a next data record on said designated track;

means responsive to said sensed address mark for writing said designated track of said rotating media into said buffer means.

13. The apparatus of claim 12 wherein each of said address mark triggered read/write head buffers further includes:

means responsive to an availability of a data channel from said control module to said processor for transmitting said requested data record from said buffer means to said processor via said control module via said bus.

14. A data storage system connected to a processor, said data storage system comprising:

a control module;

a plurality of rotating media on which data is stored in tracks;

a plurality of read/write heads for reading and writing data on an associated one of said rotating media;

a bus connected to said control module and said plurality of data storage devices for exchanging control and data signals therebetween;

a plurality of buffer means, each of which is connected to said bus and of said read/write heads for storing data read by said one read/write head from said associated one rotating media;

means in each of said read/write heads responsive to said processor requesting data stored on a designated track for detecting an address mark written on said designated track;

means in each of said read/write heads responsive to said detecting means for writing said designated track into said buffer means;

means responsive to an availability of a data communication path from said control module to said processor for retrieving said requested data from said designated track stored in said buffer means;

means for transmitting said requested data to said control module via said bus.

15. The apparatus of claim 14 wherein said writing means includes:

means for detecting a beginning of a first data record that appears on said designated track subsequent to said data request;

means responsive to said detecting means for transferring the contents of said one track into said buffer means.

16. The apparatus of claim 15 wherein said excerpting means includes:

means responsive to said transferring means for identifying a beginning of said requested data on said designated track.

17. A data storage system connected to a processor by at least one data channel, said data storage system comprising:

a control module;

a plurality of rotating data storage devices on which data is stored in tracks on rotating media via a read/write head;

a common bus connected to said control module and said plurality of data storage devices;

a plurality of buffer means, each of which is connected to said bus and an associated one of said data storage device read/write heads for storing data read by said one associated read/write head from said rotating media;

means, connected to each of said buffer means and responsive to said processor requesting data stored on said data storage device, for writing a track of said rotating media that contains said requested data into said buffer means, including:

means for detecting an address mark written on said one track a predetermined distance in advance of a first data record that appears on said one track of said data storage media that contains said requested data subsequent to said data request;

means, responsive to said detecting means, for transferring the contents of said one track into said buffer means;

means responsive to an availability of a data channel from said control module to said processor, for retrieving said requested data from said one track stored in said buffer means;

means, responsive to an availability of a data communication path from said control module to said processor for transmitting said requested data from said buffer means to said control module via said bus.

* * * * *